United States Patent
Erdem et al.

(10) Patent No.: US 6,911,487 B2
(45) Date of Patent: Jun. 28, 2005

(54) PROCESS FOR PREPARING AQUEOUS DISPERSIONS OF HYBRID POLYURETHANE PARTICLES

(75) Inventors: Bedri Erdem, Pearland, TX (US); Debkumar Bhattacharjee, Lake Jackson, TX (US); Alan K. Schrock, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 440 days.

(21) Appl. No.: 10/015,815

(22) Filed: Nov. 2, 2001

(65) Prior Publication Data

US 2002/0177654 A1 Nov. 28, 2002

Related U.S. Application Data

(60) Provisional application No. 60/245,331, filed on Nov. 2, 2000.

(51) Int. Cl.$^7$ ............................ C08F 2/16; C08G 18/10; C08L 75/04; C08J 3/00; C08J 5/18
(52) U.S. Cl. .................... 523/201; 524/457; 524/500; 524/507; 525/123; 525/127; 525/131; 525/455; 525/902
(58) Field of Search ................... 523/201; 524/457, 524/500, 507; 525/123, 127, 131, 455, 902

(56) References Cited

U.S. PATENT DOCUMENTS

| | | | |
|---|---|---|---|
| 4,734,445 A | * | 3/1988 | Noda et al. ................. 523/201 |
| 5,169,895 A | | 12/1992 | Coogan et al. .............. 524/591 |
| 5,173,526 A | | 12/1992 | Vijayendran et al. ....... 527/457 |
| 5,314,942 A | | 5/1994 | Coogan et al. .............. 524/457 |
| 5,451,653 A | | 9/1995 | Chen et al. .................. 525/374 |
| 5,521,246 A | | 5/1996 | Tien et al. ................... 524/507 |
| 5,547,710 A | | 8/1996 | Satgurunathan et al. .... 427/386 |
| 5,594,065 A | | 1/1997 | Tien et al. ................... 524/507 |
| 5,786,420 A | | 7/1998 | Grandhee ....................... 525/7 |
| 5,959,003 A | * | 9/1999 | Lo et al. ...................... 523/201 |
| 5,959,027 A | | 9/1999 | Jakubowski et al. ......... 524/839 |
| 6,087,440 A | | 7/2000 | Skaggs et al. .............. 524/839 |
| 6,197,874 B1 | | 3/2001 | Irle et al. |

FOREIGN PATENT DOCUMENTS

| | | |
|---|---|---|
| DE | 43 15 269 A1 | 11/1994 |
| EP | 0 810 246 A2 | 12/1997 |
| EP | 0 849 295 A2 | 6/1998 |
| WO | 93/24551 | 12/1993 |
| WO | 98/41554 | 9/1998 |
| WO | 00/61651 | 10/2000 |
| WO | 00/61653 | 10/2000 |

* cited by examiner

Primary Examiner—Rabon Sergent

(57) ABSTRACT

Dispersions of hybrid polyurethane particles are made using miniemulsion techniques. An isocyanate-terminated prepolymer and a monomer are mixed and dispersed in an aqueous phase to form a dispersion of droplets. All droplets are polymerized and chain-extended in one step to form hybrid particles containing a polyurethane and a polymer of the monomer. This process provides a simple method of making hybrid particles, in which particle size and the number of particles is controlled in the mixing step. The hybrid particles often have a core-shell morphology, with the polyurethane being concentrated in the shell and the polymer being concentrated in the center of the particle.

21 Claims, No Drawings

PROCESS FOR PREPARING AQUEOUS DISPERSIONS OF HYBRID POLYURETHANE PARTICLES

CROSS-REFERENCE TO RELATED APPLICATION

This application claims benefit of provisional application 60/245,331 filed Nov. 2, 2000.

BACKGROUND OF THE INVENTION

This invention relates to aqueous polyurethane dispersions and methods of manufacturing them.

Aqueous dispersions of polyurethanes are well known. They are used, for example, in making various types of films and coatings.

For several reasons, it is sometimes desirable to incorporate other polymers of various types into a polyurethane dispersion. This can be done, for example, by blending a dispersion of polyurethane particles with a dispersion of particles of some other polymer. An example of this technique is described in U.S. Pat. No. 5,547,710 to Satgurunathan et al.

U.S. Pat. No. 5,314,942 to Coogan et al. describes a process where a polyurethane dispersion is made and particles of a second polymer are prepared in situ in a separate polymerization step. Similar processes are described in U.S. Pat. No. 5,521,246 to Tien et al., U.S. Pat. No. 5,786,420 to Grandhee and WO 93/24551. These techniques require multiple polymerization steps in order to from high solids dispersions. In addition, most of these processes include a monomer feed step that requires the fed monomer to diffuse through the aqueous phase to the particles of chain-extended polyurethane. The kinetics and particle nucleation mechanisms are difficult to control in these processes due to a significant amount of polymerization that occurs within the aqueous phase. This leads to coagulation and increased viscosity. Moreover, although some of the monomers may migrate to the polyurethane particles, a significant amount of the monomers nucleate in the aqueous phase to form new particles, which do not contain polyurethane and thus do not have the desired morphology.

The process described in U.S. Pat. No. 5,451,653 to Chen et al. purports to make a hybrid dispersion by simultaneously polymerizing a monomer and chain extending a prepolymer. A special type of activated keto methylene compound is used as a crosslinker. As is typical of many processes for making hybrid dispersions, the prepolymer contains ionic groups (typically carboxylate groups) in order to impart stability to the dispersion. This makes the stability of the dispersion sensitive to pH.

It would be desirable to provide a simple, inexpensive process by which dispersions of hybrid polyurethane particles can be prepared in a single step in which the composition of the particles and their morphology can controlled

SUMMARY OF THE INVENTION

In one aspect, this invention is a process for making a polymer dispersion, comprising (a) forming a mixture of (1) an isocyanate-terminated prepolymer substantially devoid of acid or ionic groups and (2) at least one monomer having at least one site of polymerizable carbon-carbon unsaturation and which is liquid or solid at room temperature, the prepolymer being soluble in the monomer(s) at the relative proportions that are present;

(b) dispersing the mixture into an aqueous phase under conditions sufficient to form an aqueous dispersion of a plurality of stabilized droplets that have an average diameter of no greater than about 1000 nm and contain both the prepolymer and the monomer(s), and (c) subjecting the dispersion from step (b) to conditions sufficient to polymerize the monomer(s) and chain-extend said prepolymer in a single step to form a plurality of hybrid polymer/polyurethane particles having an average diameter of no greater than about 1000 nm dispersed in said aqueous phase.

In a second aspect, this invention is a dispersion of polymer particles in a continuous aqueous phase, wherein the polymer particles comprise hybrid particles of a polyurethane and a polymer of a monomer having at least one site of polymerizable carbon-carbon unsaturation, further characterized in that the hybrid polymer particles have an average diameter of no greater than about 1000 nm and exhibit a core-shell morphology on transmission electron spectroscopy in which the hybrid particles have a core portion rich in the polymer and a shell portion that is rich in the polyurethane, and wherein fewer than 10 volume percent of the polymer particles are particles that are substantially devoid of the polyurethane.

In a third aspect, this invention is a film of a hybrid polyurethane, prepared by casting or coagulating the dispersion of the second aspect or a dispersion made in the first aspect.

The method of the first aspect of the invention provides a simple way to prepare aqueous dispersions of hybrid polyurethane particles. The method allows for the formation and sizing of droplets during a dispersing or emulsification step. The subsequent polymerization and chain extension step is preferably performed without further particle nucleation or particle growth. Thus, the final product will contain substantially the same number of particles as the dispersion made during the initial emulsification step. In addition, the size of the polymer particles tends to be the same as or nearly the same as the size of the particle droplets. Thus, the process allows for direct control of particle size through the conditions of the emulsification step. In addition, the process avoids monomer feeds to chain-extended polyurethane particles and other process steps that, in conventional processes, often lead to increases in viscosity and coagulation.

In most cases, the product dispersion contains mostly hybrid polymer particles. The hybrid polymer particles will contain both polyurethane and a second polymer that is formed by polymerizing the monomer(s) having polymerizable carbon-carbon unsaturation. The polymer particles often have a core-shell morphology, in which the shell portion is rich in polyurethane and the core portion is rich in the other polymer.

The product dispersion is useful in making coatings and films, as well as other types of articles.

DETAILED DESCRIPTION OF THE INVENTION

In this invention, the term "polyurethane" is used as a shorthand for the chain-extended prepolymer. The prepolymer may contain urethane or urea groups, or combinations of these. The term "monomer" is used herein as a shorthand for the monomer(s) having at least one site of polymerizable carbon-carbon unsaturation. The term "polymer" is used to refer to a polymer formed by polymerizing the monomer(s).

The isocyanate-terminated prepolymer used in this invention is characterized as being substantially devoid of acid or ionic groups, containing free isocyanate (—NCO) groups, and being soluble in the monomer(s) at the relative proportions that are present. The prepolymer is preferably liquid, or a solid having a melting temperature of less than about 100° C., especially less than 50° C. Most, preferably, the prepolymer is a liquid at 25° C.

By "substantially devoid of acid or ionic groups", it is meant that the prepolymer is not made using any raw material or process that is expected to introduce acid or ionic groups into the prepolymer. Thus, for example, no raw materials containing acid or ionic groups are used in making the prepolymer. However, the prepolymer may contain incidental amounts of acid or ionic groups such as may be introduced due to impurities in the raw materials and/or side reactions that occur during processing, but these amounts should be very small, such as less than about 0.05, preferably less than 0.01, equivalent of acid or ionic groups per mole of prepolymer.

The prepolymer contains free isocyanate groups. The isocyanate content of the prepolymer can range very broadly, such as from about 0.5 wt. % to about 35 wt. % based on the total weight of the prepolymer. Optimal isocyanate contents will vary depending on the application. In general, hard, more rigid polyurethanes are made when the isocyanate content is relatively high, such as from about 15–35 wt. %, whereas softer, less rigid polyurethanes are made when the isocyanate content is lower. A preferred isocyanate content for many applications is from about 0.5 to about 12 wt. %, more preferably from about 1 to about 10 wt. % and especially from about 4 to about 9 wt. %.

The prepolymer contains on average at least 1.5, preferably at least 1.8 isocyanate groups/molecule, and may contain up to 8 or more isocyanate groups/molecule, preferably up to about 6 isocyanate groups/molecule, more preferably up to about 4 isocyanate groups/molecule and especially up to about 3 isocyanate groups per molecule.

Although not critical to the invention, the prepolymer is preferably water-dispersible. By "water-dispersible", it is meant that the prepolymer is capable of being dispersed in water to form a dispersion without significant separation of the aqueous and prepolymer phases into layers. A water-dispersible prepolymer tends to provide at least two advantages: first, it facilitates making a stable dispersion of prepolymer/monomer droplets during the dispersing step and second, it promotes the formation of smaller droplets (which also tends to improve stability). However, it is possible to achieve these properties even with a prepolymer that is not water-dispersible, using an appropriate selection of external surfactant(s) and/or costabilizer as described below.

The prepolymer most typically is the reaction product of an organic polyisocyanate material and an isocyanate-reactive material having two or more isocyanate-reactive groups. In order to provide the prepolymer with free isocyanate groups, an excess of the polyisocyanate is used.

Organic polyisocyanates that may be used to make the prepolymer include aliphatic, cycloaliphatic, arylaliphatic aromatic isocyanates and mixtures thereof. Aromatic isocyanates, especially aromatic polyisocyanates are preferred.

Examples of suitable aromatic isocyanates include the 4,4'-, 2,4' and 2,2'-isomers of diphenylmethane diisocyanate (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanato-3,3'-dimethyldiphenyl, 3-methyldiphenyl-methane-4,4'-diisocyanate, diphenyletherdiisocyanate, 2,4,6-triisocyanatotoluene and 2,4,4'-triisocyanatodiphenylether.

Mixtures of isocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine isomers or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, saturated analogues of the above mentioned aromatic isocyanates and mixtures thereof.

The isocyanate-reactive material has an average of at least 1.5, preferably at least 1.8 isocyanate-reactive groups per molecule. It preferably has on average up to about 8, more preferably up to about 6, even more preferably up to about 4 and especially up to about 3 isocyanate-reactive groups per molecule. Individual isocyanate-reactive materials may have as few as one isocyanate-reactive group per molecule, when used with other isocyanate-reactive materials having more isocyanate-reactive groups such that the mixture on average has at least 1.5 isocyanate-reactive groups per molecule.

The isocyanate-reactive groups are any heteroatom groups that will react with an isocyanate to form a covalent bond therewith. Preferred isocyanate-reactive groups are hydroxyl, primary amine or secondary amine groups, with primary and secondary hydroxyl groups being preferred. As is well known in the art of making polyurethane and/or polyurea polymers, isocyanate-reactive materials come in many types, with the selection of a particular type being made according to the properties that are desired in the product. Isocyanate-reactive materials are well known in the art and include those described herein and any other commercially available polyol and/or (less preferably) SAN, PIPA or PHD copolymer polyols. (SAN is styrene-acrylonitrile. PIPA is the reaction of an olamine with a polyisocyanate to produce polyaddition products, as described in U.S. Pat. No. 4,374,209. PHD stands for polyharnstoffdispersion. Such polyols are described in Polyurethane Handbook, by G. Oertel, $2^{nd}$ edition, Hanser publishers.) Mixtures of one or more polyols and/or (less preferably) one or more copolymer polyols may also be used. A large number of suitable isocyanate-reactive materials are described in columns 3–5 of U.S. Pat. No. 4,394,491 incorporated herein by reference. Among these are polyethers and polyester polyols. However, preferred polyols have an average equivalent weight per isocyanate-reactive group of from about 250 to about 8000, preferably about 500 to about 3000, more preferably about 500 to about 2500. Particularly preferred are the polyether polyols that are polymers of a $C_{2-4}$ alkylene oxide or tetrahydrofuran. These can be used in admixture with other isocyanate-reactive materials that have equivalent weights as low about 31, if desired.

Especially preferred isocyanate-reactive compounds are polymers of ethylene oxide, propylene oxide or mixtures thereof. Isocyanate-reactive compounds having repeating units derived from ethylene oxide tend to be somewhat hydrophilic and, other things being held constant, are increasingly hydrophilic as the oxyethylene content increases as a proportion of their total weight. Increasing hydrophilicity tends to mean that the prepolymer is increasingly water-dispersible when a prepolymer/water mixture is subjected to shear. Thus, when a water-dispersible prepolymer is desired, it is preferred that at least a portion of the isocyanate-compound used to make the prepolymer is a polymer containing oxyethylene units. The polymer containing oxyethylene units may be a homopolymer of ethylene oxide, a random copolymer of ethylene oxide and another alkylene oxide, or a block copolymer of ethylene oxide and another alkylene oxide. Examples of such isocyanate-reactive polymers are (A) random copolymers of propylene oxide and ethylene oxide, in which oxyethylene units comprise from about 5 to about 80, especially from about 10 to about 50 percent of the total weight of the copolymer; (B) poly(propylene oxide) polymers that have terminal poly(ethylene oxide) blocks that together constitute from about 5 to about 80, especially from about 5 to about 25% of the total weight of the polymer; (C) polyethers having one or more internal poly(ethylene oxide) blocks that together constitute from about 5 to about 80, especially from about 5 to about 50% of the total weight of the polyether, and (D) homopolymers of ethylene oxide. Mixtures of a polymer containing oxyethylene groups and one or more other isocyanate-reactive materials tend to provide good water-dispersibility to the prepolymer if the oxyethylene content of the mixture is from about 5% or more, based on the total weight of the mixture, especially from about 5 to about 25%.

Other especially preferred isocyanate-reactive materials are polymers of propylene oxide and polyester polyols, such as 1,4-butandiol adipate polyester polyols.

The prepolymer is made by mixing a stoichiometric excess of the polyisocyanate and the isocyanate-reactive material under conditions sufficient to cause the isocyanate and isocyanate-reactive groups to react. The preparation of isocyanate-terminated prepolymers is well-known, and no particular conditions of the reaction are critical to this invention provided that an isocyanate-terminated prepolymer is formed. Typically, the reaction is performed in the presence of a catalyst, such as (a) tertiary amines such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethyl piperazine, 1,4-diazobicyclo-2,2,2-octane, bis(dimethylaminoethyl)ether and triethylenediamine; (b) tertiary phosphines such as trialkylphosphines and dialkylbenzylphosphines; (c) chelates of various metals such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; (d) acidic metal salts of strong acids such as ferric chloride, stannic chloride, stannous chloride, antimony trichloride, bismuth nitrate and bismuth chloride; (e) strong bases such as alkali and alkaline earth metal hydroxides, alkoxides and phenoxides; (f) alcoholates and phenolates of various metals such as $Ti(OR)_4$, $Sn(OR)_4$ and $Al(OR)_3$, wherein R is alkyl or aryl, and the reaction products of the alcoholates with carboxylic acids, β-diketones and 2-(N,N-dialkylamino) alcohols; (g) salts of organic acids with a variety of metal such as alkali metals, alkaline earth metals, Al, Sn, Pb, Mn, Co, Ni and Cu, including, for example, sodium acetate, stannous octoate, stannous oleate, lead octoate and metallic driers such as manganese and cobalt naphthenate; (h) organometallic derivatives of tetravalent tin, trivalent and pentavalent As, Sb and Bi and metal carbonyls of iron and cobalt and (i) mixtures of two or more of the foregoing. Reaction temperatures of from ambient (22° C.) to 150° C. or more can be used. The prepolymer made be made neat or in a solvent if desired.

The prepolymer is mixed with one or more monomers that have at least one site of polymerizable carbon-carbon unsaturation. At least one of the monomers is a liquid or solid at room temperature, and is most preferably a liquid at room temperature. The monomer is a solvent for the prepolymer at the relative proportions that are mixed together to form the dispersion. Preferably, the monomer(s) are substantially insoluble in water, i.e., are soluble to an extent of less than 10 grams, preferably less than 5 grams, more preferably less than 2 grams, especially less than 1 gram, of monomer per 100 grams of water at 25° C. More highly water-soluble monomers can be used, especially if they form oligomers (containing up to 10 repeating units) that are substantially water-insoluble. However, the use of more highly water-soluble monomers is less preferred. When monomers that are relatively soluble in water are used, it is sometimes necessary to use a more hydrophilic prepolymer and/or employ additional stability additives (such as a costabilizer as discussed below) in order to keep the monomers dispersed in the prepolymer droplets.

Suitable monomers include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene, ar-bromostyrene, dibromostyrene, tribromostyrene, 2,5-dichlorostyrene, bromostyrene, fluorostyrene and trifluoromethylstyrene; α,β-ethylenically unsaturated carboxylic acids and esters thereof, including itaconic acid, acrylic acid, methacrylic acid, and acrylic and methacrylic esters such as methyl methacrylate, ethyl acrylate, 2-hydroxyethyl acrylate, 2-hydroxyethylmethacrylate, n-butyl acrylate, t-butyl acrylate, n-butyl methacrylate, t-butyl methacrylate, n-hexyl acrylate, maleic anhydride and the like; α,β-ethylenically unsaturated nitriles and amides such as acrylonitrile, methacrylonitrile, acrylamide, methacrylamide, N,N-dimethylacrylamide, N-(dimethylaminomethyl) acrylamide and the like, vinyl esters such as vinyl acetate; vinyl ethers; vinyl ketones; vinyl and vinylidene halides such as vinylidene chloride and vinyl chloride; maleimide, N-arylmaleimide, and N-alkymaleimides such as maleimide and N-ethyl maleimide, 1-vinyl-2-pyrrolidinone and vinyl pyridine. Mixtures of two or more of the aforementioned monomers are also suitable in making the copolymer. Among these, the monovinyl aromatic and acrylic or methacrylic esters are preferred.

Monomers containing more than one site of polymerizable carbon-carbon unsaturation can be used if desired to form a crosslinked polymer. Such monomers will typically constitute no more than about 10 mol-%, preferably from about 0.25–5 mol-%, of total monomers. Except when a conjugated diene monomer is used, it is most preferred not to use a crosslinking monomer. In addition, ethylenically unsaturated monomers that contain functional groups that can react form a covalent bond between the polymer and the polyurethane can also be used. Suitable monomers of this type will include one site of polymerizable carbon-carbon unsaturation and an isocyanate-reactive group such as a hydroxyl group, an epoxide or a primary or secondary amino group. Among the monomers of this type are 2-hydroxyethyl methacrylate, 2-hydroxyethyl acrylate, 2-hydroxybutyl methacrylate, allyl alcohol, glycidyl methacrylate, diaminoethyl methacrylate, and the like. However, it is preferred not to use such a functional group-containing monomer.

To make the dispersion, the prepolymer and liquid or solid monomer(s) are mixed and the mixture is dispersed into the aqueous phase. If the monomer is solid at room temperature, it may be heated to above its melting temperature in order to mix it with the prepolymer. The same is true when the prepolymer is solid at room temperature. The ratio of prepolymer to monomer(s) may vary widely, depending on the properties that are desired in films or castings to be made from the dispersion. However, it is preferred to use sufficient monomer such that the mixture has a viscosity such that it can be readily dispersed into the aqueous phase to form droplets of the desired size. Suitable such viscosities are preferably no greater than about 50,000 cps (50 Pa·s) at 25° C., preferably no greater than about 20,000 cps (20 Pa·s), especially no greater than about 10,000 cps (10 Pa·s) and most preferably no greater than about 1000 cps (1.0 Pa·s). This lower viscosity facilitates the control of particle size and polydispersity index (particle size distribution). The weight ratio of prepolymer to monomers may range from about 10:90, preferably from about 30:70, more preferably from about 40:60 to about 90:10, preferably to about 80:20 and most preferably to about 75:25.

The prepolymer/monomer mixture is dispersed into an aqueous phase under conditions that the prepolymer/monomer mixture forms droplets dispersed in the aqueous phase that have an average diameter of from about 1000 nm or less. Preferably, the droplets thus formed have average diameters of from about 50 nm, more preferably 70 nm, to about 500 nm, more preferably 350 nm, even more preferably 250 nm and especially 200 nm. The weight of the disperse phase ("solids", after polymerization) may vary widely, from just above zero weight percent of the dispersion to 60% or more. The solids preferably constitute from about 10%, more preferably from about 20%, even more preferably from about 30% to about 60%, more preferably about 50% of the weight of the dispersion.

In order to produce the required droplet size, high shear mixing techniques such as homogenization or high pressure impingement mixing are useful. A suitable high shear impingement mixing device is a MICROFLUIDIZER® emulsifier, available from Microfluidics Corporation. Such a mixing device is described in U.S. Pat. No. 4,533,254. Ultrasonic mixing is also suitable. Electric dispersers and ultrasonfiers that convert electrical energy to high frequency mechanical energy can also be used. In addition, mechanical dispersing equipment, such as IKA, OMNI type mixers, may be used to disperse the prepolymer/monomer mixture in the aqueous phase.

Monomers that are low-boiling or gaseous at room temperature (such as isoprene and butadiene) are conveniently added to an already-formed dispersion of the prepolymer/monomer mixture, before conducting the chain extension and polymerization step. To use such monomers, a pressure vessel is conveniently charged with the dispersion of the prepolymer/monomer mixture in the aqueous phase, and the vessel is pressurized with the gaseous monomer. The contents of the pressure vessel are then held, optionally with agitation, until the desired quantity of the gaseous monomer becomes dissolved in the dispersion. Because the gaseous monomer is typically hydrophobic, it will migrate through the aqueous phase and into the prepolymer/monomer particles. In this way, particle size is set before polymerization occurs. The subsequent polymerization in this case is likewise conducted under pressure.

The aqueous phase includes water. In addition, it is highly preferred that the aqueous phase contains an external surfactant that provides stabilization for the particles. By "external", it is meant that the surfactant does not include the prepolymer or form part of the prepolymer. However, if the prepolymer contains hydrophilic groups (such as poly (oxyethylene groups), these may provide sufficient compatibility with the aqueous phase to form stable droplets. Droplet instability is generally caused by Brownian collisions and diffusion of monomer from the droplets, where the monomer either renucleates to form new particles or swells existing particles. Instability due to Brownian collisions can be reduced through the adequate coverage of a surfactant layer on the surface of the droplets. Diffusion of monomers can be reduced by appropriate droplet stabilization and producing smaller sized droplets. The external surfactant will contain relatively hydrophilic groups as well as relatively hydrophobic groups, and is more soluble in the aqueous phase than the droplets. The hydrophobic groups adsorb onto the droplets while the hydrophilic groups extend into the aqueous phase to bring about stabilization. The surfactant preferably will adsorb onto the dispersed droplets and reduce the interfacial tension between the droplets and the aqueous phase to about 5 dynes/cm or below.

Among the useful surfactants are a wide range of anionic, cationic and nonionic surfactants. Anionic and nonionic surfactants are generally preferred. Anionic and cationic surfactants can be characterized generally in that they contain one or more ionic (anionic or cationic) groups and a hydrophobic group. Suitable anionic groups include carboxylate groups and sulfonate groups. Suitable cationic groups include ammonium and phosphonium groups. The hydrophobic group is preferably an aromatic group having 6 or more carbon atoms, an aliphatic group having 6 or more, preferably about 8 to about 30, carbon atoms, or a combination of aromatic and aliphatic groups that contain a total of from about 6 to 30 carbon atoms. Preferred anionic and cationic surfactants contain at least one acyclic alkyl or alkenyl group having 6 or more carbon atoms. In addition, the anionic and cationic surfactants can contain other moieties such as oxyalkylene groups, including oxyethylene and/or oxypropylene groups. Examples of suitable anionic and cationic surfactants include sodium lauryl sulfate, linear dodecyl benzyl sulfonate, triethanolaminelauryl sulfate, sodium dodecyl diphenyl oxide disulfonate, sodium n-decyl diphenyl oxide disulfonate, sodium hexyl diphenyl oxide sulfonate, dodecyl benzene sulfonic acid, sodium or ammonium stearate, sodium abietic acid, and the like. Examples of commercially available surfactants of these types include Polystep™ A-15 and Bisfot™ S-100 from Stepan Chemical, Desulf™ TLS-40 from Deforest, Dowfax™ 2A1, 3B2 and C6L from The Dow Chemical Company, Emkapol™ PO-18 from Emkay, Dresinate™ TX from Hercules and Triton™ X-100, X-405 and X-165 from Union Carbide.

Suitable nonionic surfactants include, for example, polymers of ethylene oxide and/or propylene oxide, especially polymers of ethylene oxide, that contain a hydrophobic group as described in the preceding paragraph, as well as the various organosilicone surfactants. Examples of suitable commercially available surfactants are Pluronics™ L43 and L44 surfactant, Tetronic™ 701 and 704 surfactants, all from BASF, Tween™ 20 surfactant, available from ICI, and Igepal™ CO-850 and CO-630 surfactants, available from Rhone-Poulenc.

Most preferred surfactants are alkyl sulfate and alkyl sulfonate-type anionic surfactants, and mixtures of either or both of them with a nonionic surfactant.

To provide further particle stability, and to help prevent migration of the monomer into the aqueous phase from the droplets, a costabilizer may be used. Generally, though, costabilizers will typically be used in conjunction with an external surfactant or a prepolymer having hydrophilic groups. As used herein, a costabilizer is a material other than a prepolymer or ethylenically unsaturated monomer, which has a molecular weight below about 300, preferably below about 200, and is soluble in water to the extent of about $10^{-5}$ g/liter or less at 25° C. The costabilizer tends to retard diffusion of the monomer out of the droplets by swelling with monomer due to the costabilizer's relatively low molecular weight and low water solubility. The costabilizer also promotes the absorption of surfactant at the water/droplet interface, thus enhancing the stability of the dispersion. Among the suitable costabilizers are alkanes and alkanols, each having from about 6 to about 30 carbon atoms. Preferred alkane costabilizers include straight-chain alkanes having from about 8 to about 18, especially from about 10 to about 16 carbon atoms. Hexadecane is especially preferred. Among the preferred alkanol stabilizers are straight chain alcohols having from about 8 to 22 carbon atoms, especially 12–20 carbon atoms.

Although the amount of external surfactant and costabilizer used will depend somewhat on the particular system, in general from about 0.1 to about 5 parts by weight of surfactant are used, per 100 parts by weight of the dispersion. If used, costabilizers generally constitute from about 0.1 to about 3 percent of the total weight of the dispersion.

The surfactant is preferably added to the aqueous phase before dispersing the prepolymer/monomer mixture. The costabilizer, when used, can be added either to the aqueous phase or the prepolymer/monomer mixture before conducting the mixing step.

Isocyanate groups on the prepolymer will react with water in the aqueous phase to form urea linkages and liberate carbon dioxide. A certain amount of this reaction will tend to occur when the prepolymer/monomer mixture is dispersed. However, the extent to which this reaction occurs tends to be small, primarily because most of the free isocyanate groups are not at the surface of the droplets and thus are not accessible to react with the aqueous phase. In addition, conditions can be selected which promote or discourage the water/prepolymer reaction, such as, for example, maintaining the raw materials at low to moderate temperatures (i.e., 0–30° C.) as the dispersion is formed (and stored prior to polymerization/chain extension). It is preferred to select conditions for making and dispersion and storing it prior to the polymerization/chain extension step such that no more than about 25%, especially no more than about 10% of the isocyanate groups react prior to the time the polymerization step is performed.

The dispersion is then subjected to conditions sufficient to effect polymerization of the monomers and chain-extend the prepolymer. Such conditions generally include an elevated temperature, such as from about 50 to about 150° C., more preferably from about 70–130° C., and the presence of an initiator for the polymerization of the monomers. The temperature of polymerization, as well as the time required to complete the polymerization, is usually dependent on the particular initiator system that is used, as different initiators tend to decompose to form free radicals at different rates and at different temperatures. Thus, the polymerization/chain extension temperature is generally selected in conjunction with the particular initiator to obtain optimum polymerization efficiency. The dispersion is usually mixed during the polymerization and chain extension process in order to prevent the prepolymer/monomer droplets from coagulating, to facilitate heat transfer and, when chain extenders, initiators or other materials are added during the polymerization, material transfer as well.

The initiator is preferably one that preferentially partitions into the organic (prepolymer/monomer) phase, i.e., is not substantially soluble in the aqueous phase. The use of initiators of this type tends to minimize polymerization in the aqueous phase. However, water-soluble initiators can be used, it being believed that in most instances aqueous phase polymerization will create oligomeric species that partition into the organic phase where further polymerization proceeds. Among the useful initiators are free-radical initiators such as peroxy compounds and azo compounds. Redox systems that include reducing agents and oxidizing agents are also useful. Among the useful initiators are organic peroxides such as di-t-butyl peroxide, t-butylhydroperoxide, lauryl peroxide, dichlorobenzoyl peroxide, cumene hydroperoxide and the like; hydrogen peroxide, peroxycarbonates such as diisopropyl peroxydicarbonate, dicyclohexyl peroxy dicarbonate and the like, sulfonyl peroxides such as acetyl cyclohexyl sulfonyl peracetate, sulonylhydrozides, azo compounds such as 2,2'-azobis(2,4-dimethylpentanenitrile) and 2,2'-azobis)2-methylpropanenitrile (AIBN), 2,2-azobis (isobutyronitrile) t-butylhydroperoxide, inorganic peroxides such as ammonium peroxydisulfate, and potassium peroxy disulfate, sodium metabisulfite/ferrous ammonium sulfate and the like. Among these, the oil-soluble ones (i.e., those that are more soluble in the droplets than the aqueous phase) are most preferred. A controlled living free radical polymerization where a metal containing initiator, 2,2,6,6-tetramethylene piperadine-1-oxy (TEMPO), is used is also suitable. Such initiators, although often water-soluble, can be emulsified into the prepolymer/monomer mixture. This last type of polymerization allows for particularly good control of polymer molecular weight.

The amount of initiator is selected to provide a controlled reaction that proceeds at an economically attractive rate. The precise amounts will vary somewhat with the particular initiator, but in general about 0.05 to about 5% by weight based on monomers is sufficient. Unlike some prior art process, the concentration of initiator in this system does not significantly affect particle size or the number of particles that are formed, as these parameters are usually set in the step of dispersing the prepolymer/monomer mixture into the aqueous phase. However, increasing the amount of initiator will tend to affect polymer molecular weight and the rate of polymerization.

The initiator is preferably blended into the prepolymer/monomer mixture before it is dispersed into the aqueous phase. Generally, premature polymerization can be controlled by maintaining the temperature below that at which the initiator generates significant quantities of free radicals.

When a water-insoluble initiator is used, it is preferred to add it after the prepolymer/monomer mixture has been dispersed in the aqueous phase. The use of a water-soluble initiator tends to be associated with a small amount of polymerization occurring in the aqueous phase, which is generally undesired. However, many monomers that are somewhat water-soluble form polymers that are decreasingly water-soluble as their molecular weight increases. Thus, the oligomeric materials that form as a result of this water phase polymerization often migrate to the dispersed prepolymer/monomer droplets and further polymerize there.

The chain extension of the prepolymer occurs in the same step as the polymerization of the monomer. The chain extension occurs through reaction of the isocyanate-groups of the prepolymer with water from the aqueous phase, some auxiliary chain extender, or both. In the context of this invention, an auxiliary chain extender is a material other than water that has at least two isocyanate-reactive groups, a weight per isocyanate-reactive group of about 500 daltons or less, preferably about 150 daltons or less, especially 80 daltons or less, and which reacts with isocyanate groups on two or more prepolymer molecules to form a covalently bonded linkage between them. Suitable chain extenders include polyols, ammonia, alkanolamines, various hydrazines, aminoalcohols and polyamines. Hydrazines and polyamines are preferred. Specific examples of useful chain extenders include ethanolamine, isopropanol amine, diethanol amine, diisopropanol amine, ethylene diamine, diethylene triamine, triethylenetetraamine, propylene diamine, butylene diamine, cyclohexylenediamine, piperazine, 2-methyl piperazine, phenylenediamine, toluene diamine, tris(2-aminoethyl)amine, 4,4'-methylene-bis(2-chloroaniline), 3,3'-dichloro-4,4'-diphenyldiamine, 4,4'-diphenyldiamine, 2,6-diaminopyridine, 4,4'-diamine diphenylmethane, isophorone diamine, diethyltoluene diamine, aminoethylethanolamine and adducts of diethylene triamine. Water-soluble chain extenders are most preferred, as maintaining the chain extender and prepolymer in separate phases helps to retard premature chain extension.

It is most preferred to add a water-soluble chain extender to the aqueous phase after the prepolymer/monomer mixture has been dispersed into it. If a water-insoluble chain extender is used, it is preferably mixed in with the prepolymer/monomer mixture before the dispersion is made. In this case, conditions such as reduced temperatures are selected to prevent premature chain extension.

Once the initiator is added, the dispersion is heated to a temperature at which the initiator becomes activated, and the monomers polymerize. At the temperatures described above, polymerization is typically completed in about 30 to about 300 minutes. Chain extension of the prepolymer proceeds simultaneously, and no additional process steps are required to accomplish chain extension in this way. Although this invention is not limited by any theory, it is believed that as the monomers polymerize, the resulting polymer in most cases tends to become increasingly hydrophobic. Thus, the polymer tends to migrate inwardly to the center of the droplets as it grows in molecular weight, due to its increasing hydrophobicity and the decreasing miscibility between the polymer and the prepolymer/polyurethane. For the same reasons, the prepolymer migrates outwardly toward the exterior. In this way, more isocyanate groups become exposed to the surface of the droplets, where they can react with water or a water-soluble chain extender. In the less preferred case where the chain extender is soluble in the droplets, chain extension occurs merely as a matter of increasing the temperature of the system.

A catalyst for the chain extension reaction can be used if desired, but it is usually not necessary. Suitable catalysts include the well-known urethane catalysts, such as tertiary amines, organo-tin, -mercury -iron, -lead, -bismuth and -zinc compounds, among others.

The dispersion may also contain other ingredients, such as solvents and the like, but these ingredients, particularly volatile organic solvents, are preferably omitted.

As the chain extension and polymerization reactions become completed, the dispersed droplets form polymer particles. A characteristic of the process of this invention is that the size distribution of the polymer particles will closely resemble that of the dispersed droplets. Typically, the particle size (expressed in average diameter as measured by TEM) of the droplets changes by 10% or less during the polymerization/chain extension step. Similarly, the number of particles tends to remained relatively unchanged during the polymerization step, because renucleation of particles is minimized. Renucleated particles tend to be substantially devoid of the prepolymer. Thus, avoidance of renucleation is manifested when the product contains only a small amount of particles that are devoid of the polyurethane. Preferably, fewer than 10 volume percent of the particles in the product are substantially devoid of polyurethane. More preferably, fewer than 5 volume percent of the particles are substantially devoid of polyurethane. Most preferably, this value is no greater than about 2 volume percent.

Accordingly, control of the final particle size can be achieved directly by controlling the process of dispersing the prepolymer/monomer mixture into the aqueous phase, and through the selection of particular external surfactants or costabilizers and the amount thereof that are used. It is highly preferred not to feed additional monomers to the dispersion before or during the chain extension/polymerization process (except for gaseous monomers before chain extension/polymerization as described before), as this results in a change in particle size and can cause additional particle nucleation. The newly nucleated particles are free of polyurethane and thus do not have the desired particle morphpology.

Because the developing polymer tends to migrate toward the center of the dispersed phase, the resulting polymer particles often have a distinct core shell morphology. The shell of the particles is rich in the chain extended prepolymer, whereas the core is rich in the polymer. This is easily seen using a microscopic technique such as transmission electron spectroscopy (TEM). An exception to this occurs when a monomer having an isocyanate-reactive group is used. In this case, the polymer tends to form smaller domains that are located throughout the particles, or else resembles more of an interpenetrating network of polymer and chain extended polyurethane, without a pronounced core-shell morphology. This latter type of morphology can also be achieved through manipulations of the prepolymer and monomer compositions and process variables.

The resulting dispersion is useful in various applications. It is useful in making a variety of films and coatings. To this end, the dispersion can be blended with a variety of types of useful additives, including, for example, pigments, dyes, fillers, dryers, rheological and viscosity modifiers, dispersants, surfactants, preservatives, antimicrobials, pesticides, fertilizers and the like. The formulated dispersion can be applied to any number of types of substrates.

Films can be made by coagulation processes or by simple casting and drying, using techniques that are well known in the art. Similarly, coatings are readily prepared by forming a layer of the dispersion on a substrate and drying and/or coagulating the polymer particles to form a continuous coating.

The dispersion is also useful for making cast articles, particularly thin-walled articles such as gloves, including medical or surgical gloves, condoms, and the like. If desired, the dispersion can be formulated with various types of additives, such as those described before. The casting process typically includes applying the formulated dispersion to a suitable form and allowing the aqueous phase to evaporate so that the individual polymer particles coalesce to form a film over the form. Drying can be done at ambient or elevated temperature. To increase thickness, the casting process can be repeated as necessary.

Films, coatings and cast articles made from the dispersion of the invention tend to be characterized in having a substantially continuous polyurethane phase, in which the polymer is dispersed as submicron-size domains (especially as domains of less than about 200 nm in the largest dimension), without significant macroscopic phase segregation. In effect, the physical morphology of the particles tends to be preserved in the article, as the polymer tends to remain as discrete domains of approximately the same size as the core portion of the particles. This effect is much different than is normally seen with blends, where individual polymer particles agglomerate to form much larger polymer domains in the film, coating or article.

The following examples are provided to illustrate the invention, but are not intended to limit its scope. All parts and percentages are by weight unless otherwise indicated.

EXAMPLE 1

A. Preparation of PU Prepolymer

A polyurethane prepolymer is prepared by charging 508.16 g of a nominally 12% ethylene oxide-capped polypropylene oxide) diol with a molecular weight of about 2000 (VORANOL™ 9287 A polyol, from Dow Chemical), 16.0 grams of diethylene glycol and 16.0 g of a 950 molecular weight monofunctional poly(ethylene oxide) monol (MPEG™ 950, from Dow Chemical) into a 1000-ml flask which is previously warmed, and heating the mixture at 70° C. for 30 min. Following this procedure, 232.8 g of a 50/50 mixture of the 4,4'- and 2,4'-isomers of MDI (ISONATE™ 50 OP isocyanate, from Dow Chemical) are added to the flask and the mixture is vigorously stirred for 30 minutes. The mixture is heated at 70° C. overnight to complete the reaction. The resulting prepolymer has an NCO content of 7.1%.

B. Preparation of Dispersion 1

47.92 grams of the prepolymer from A are transferred into a 250 ml beaker containing 48 g of butyl acrylate. The mixture is warmed up to about 30° C. with vigorous stirring to allow the components to form a homogeneous mixture. 0.2 g of an oil soluble free radical initiator, AIBN (2,2'-azobis (2-methylpropionitrile), is added and allowed to dissolve for 10 minutes.

Separately, an aqueous phase is prepared by mixing 145 g of deionized water, 0.66 g sodium lauryl sulfate and 2.0 g of 22 wt % sodium dodecyl benzene sulfonate with stirring until the surfactants are completely dissolved.

The prepolymer/monomer mixture is added slowly into the aqueous phase while vigorously stirring. After all of the prepolymer/monomer mixture is charged, the crude emulsion obtained is allowed to stir for 10 minutes. The emulsion is then homogenized using a high shear sonifier (10 output power and 80 duty cycle, Branson 450, Cell disrupter) for two minutes, to form a dispersion of 133 nm prepolymer/monomer droplets dispersed in the aqueous phase. The resulting miniemulsion is charged into a reactor where it is heated at 180 rpm and 70 degrees C. for about 180–240 minutes to complete the polymerization and chain extension reactions. The product so obtained is coagulum-free. The product is filtered and contains 39.3 wt % solids. The particle size of the dispersed polymer particles is 126 nm. TEM analysis shows that the dispersed polymer particles have a distinct core-shell morphology, with a polyurethane shell and a poly(butyl acrylate) core.

EXAMPLES 2 AND 3

Dispersion Sample 2 is prepared in the same general manner described in Example 1, using the following proportions of ingredients
Prepolymer/Monomer Phase
Prepolymer, 18 g (7.1% NCO prepolymer of diphenylmethane diisocyanate, 11.44 parts VORANOL™ 9287A polyol, 0.236 parts diethylene glycol and 0.36 parts MPEG 950™ monol)
Butyl acrylate, 42 g
AIBN, 0.1 g
Aqueous Phase
Water, 185 g
Sodium lauryl sulfate, 0.6 g
Triton™ X-405 surfactant, 0.6 g
Hexadecane, 1.31 g Polymerization and chain extension are effected simultaneously by heating at 70° C. for 2–4 hours. The size of the dispersed prepolymer/monomer droplets is about 140 nm before polymerization, and the size of the polymer particles is 146 nm. Dispersion Sample 3 is made in the same manner as Dispersion Sample 2, except the prepolymer is a 5.7–6.1% NCO reaction product of 29.1 parts pure MDI, 4.2 parts ISONATE 50 OP MDI, 52 parts VORANOL 9287A polyol and 14.7 parts of a 425 molecular weight poly (propylene oxide) diol. Similar results are obtained.

EXAMPLES 4 AND 5

Dispersion Sample 4 is prepared in the same general manner described in Example 1, using the following proportions of ingredients:
Prepolymer/Monomer Phase
Prepolymer (as in Example 2), 30 g
Butyl acrylate, 30 g
AIBN, 0.1 g
Aqueous Phase
Water, 185 grams
Sodium lauryl sulfate, 0.53 g
Hexadecane, 1.3 g Polymerization and chain extension are effected simultaneously by heating at 70° C. for 2 hours. The size of the dispersed prepolymer/monomer droplets is about 118 nm before polymerization, and the size of the polymer particles is 133 nm.

Similar results are obtained for Dispersion Sample 5, which is made in the same way, except the prepolymer used in making Dispersion Sample 3 is used.

EXAMPLE 6

Dispersion Sample 6 is prepared in the same general manner described in Example 1, using the following proportions of ingredients:
Prepolymer/Monomer Phase
Prepolymer (as in Example 2), 30 g
Butyl acrylate, 18 g
Styrene, 12 g
AIBN, 0.1 g
Aqueous Phase
Water, 185 grams
Sodium lauryl sulfate, 0.66 g Polymerization and chain extension are effected simultaneously by heating at 70° C. for 2 hours. The size of the dispersed prepolymer/monomer droplets is about 145 nm before polymerization, and the size of the polymer particles 154 nm.

EXAMPLE 7

A mixture of 30 grams of a prepolymer as in Example 2, 18 grams butyl acrylate, 12 grams styrene, and 0.12 g AIBN is prepared in the general way described in Example 1. This mixture is dispersed into an aqueous phase containing 165 grams water and 0.66 gram sodium lauryl sulfate, in the manner described in Example 1. Then, 1.2 grams of piperazine in 2 grams of are added with vigorous mixing. Polymerization and chain extension are effected by heating at 70°

C. for 2 hours to form Dispersion Sample 7. The size of the dispersed prepolymer/monomer droplets is about 139 nm before polymerization, and the size of the polymer particles is 144 nm.

EXAMPLES 8 AND 9

Dispersion Sample 8 is prepared in the same general manner described in Example 1, using the following proportions of ingredients:
Prepolymer/Monomer Phase
Prepolymer (as in Example 3), 30 g
Butyl acrylate, 18 g
Styrene, 12 g
AIBN, 0.1 g
Aqueous Phase
Water, 185 grams
Sodium lauryl sulfate, 0.66 g
Sodium dodecyl benzene sulfonate (25% solids), 0.2 g Polymerization and chain extension are effected simultaneously by heating at 70° C. for 2 hours. The size of the dispersed prepolymer/monomer droplets is about 146 nm before polymerization, and the size of the polymer particles is 154 nm.

Dispersion Sample 9 is made in the same manner, except that after dispersing the prepolymer/monomer mixture in the aqueous phase, 1.2 grams of piperazine are added to the aqueous phase. Similar results are obtained.

EXAMPLE 10

Dispersion Sample 10 is prepared in the same general manner described in Example 1, using the following proportions of ingredients:
Prepolymer/Monomer Phase
Prepolymer (as in Example 3), 47.92 g
Butyl acrylate, 23.96 g
Styrene, 23.96 g
Hexadecane 2.06 g
AIBN, 0.1 g
Aqueous Phase
Water, 145 grams
Sodium lauryl sulfate, 0.96 g Polymerization and chain extension are effected simultaneously by heating at 70° C. for 2 hours. The size of the dispersed prepolymer/monomer droplets is about 138 nm before polymerization, and the size of the polymer particles is 146 nm.

Similar results are obtained when the styrene/butyl acrylate ratio is varied within the range of 30/70 to 70/30 by weight, and when the hexadecane is omitted.

EXAMPLE 11

Dispersion Sample 11 is prepared in the same general manner described in Example 1, using the following proportions of ingredients:
Prepolymer/Monomer Phase
Prepolymer, 47.92 g (as in Example 3)
Butyl acrylate, 47.92 g
2-hydroxyethyl methacrylate, 1.05 g
Organotin catalyst 0.15 g
Hexadecane, 2.06 g
AIBN, 0.1 g
Aqueous Phase
Water, 145 grams
Sodium lauryl sulfate, 0.96 g.

Polymerization and chain extension are effected simultaneously by heating at 70° C. for 2 hours.

Similar results are obtained by replacing a portion of the butyl acrylate with styrene, and by omitting the hexadecane.

EXAMPLE 12

A. Preparation of PU Prepolymer

A polyurethane prepolymer is prepared by mixing 1,075 grams of a 1,4-butanediol/adipic acid polyester polyol with a polyol mixture containing 500 g of Voranol™ 9287 polyol, 100 g of a 400 molecular weight polypropylene oxide) diol, 75 g of MPEG™ 950 monol, and 50 g of a 1000 molecular weight poly(ethylene oxide) diol, at 70° C. with stirring under a $N_2$ atmosphere. 700 parts of hydrogenated MDI ($H_{12}$MDI, an aliphatic polyisocyanate), are added to the flask, followed by a few drops of benzyl chloride. The solution is then heated to 90° C. and allowed to react overnight to form a prepolymer.

B. Preparation of Dispersion 12

Forty parts by weight of the resulting prepolymer are combined with 20 parts by weight styrene, 40 parts by weight butyl acrylate and a small quantity of 2,2'-azobis-isobutyronitrile. The resulting solution is dispersed in an aqueous phase containing sodium lauryl sulfate by passing it through a microfluidizer. The dispersion is then heated under nitrogen at 70° C. overnight to form a stable dispersion (Dispersion 12) of hybrid polyurethane particles having 40% solids. The particle size is about 0.1 microns and is monodisperse.

EXAMPLE 13

A prepolymer is made in the general manner described in Example 12, using the following ingredients:

| | |
|---|---|
| 1,4-butanediol/adipic acid polyester polyol | 64 parts by weight |
| 1000 MW poly(ethylene oxide) diol | 2 parts by weight |
| $H_{12}$ MDI | 34 parts by weight |

This prepolymer has an —NCO content of 7.78% and a viscosity of 21,300 cP (21.3 Pa·s) at 30° C. The prepolymer is dissolved in monomers, dispersed in an aqueous phase and subjected to polymerization in the general manner described in Example 12. All ratios of components are as in Example 12. The resulting dispersion (Dispersion 13) has monodisperse hybrid polyurethane particles of approximately 0.1 micron.

When the experiment is repeated, replacing the 1000 molecular weight poly(ethylene oxide) diol with an equal additional weight of the polyester polyol, the dispersion has a slightly larger particle size, and is slightly less stable.

EXAMPLE 14

A prepolymer is made in the general manner described in Example 12, using the following ingredients:

| | |
|---|---|
| Voranol ™ 9287 polyol | 63 parts by weight |
| dipropylene glycol | 4 parts by weight |
| 1000 molecular weight poly(EO) diol | 2 parts by weight |
| $H_{12}$ MDI | 31 parts by weight |

The resulting prepolymer has an —NCO content of 4.54% and a viscosity at 30° of 40500 cP (40.5 Pa·s) at 25° C. When formed into a dispersion in the general manner described in Example 12 (including all ratios of components), a stable dispersion having about 0.1 micron hybrid polyurethane particles is prepared.

What is claimed is:

1. A process for making a polymer dispersion, comprising
   (a) forming a mixture of an isocyanate-terminated prepolymer substantially devoid of acid or ionic groups and at least one monomer having at least one site of polymerizable carbon-carbon unsaturation and which monomer is a liquid or solid at room temperature, the prepolymer being soluble in the monomers at the relative proportions that are present;
   (b) dispersing the mixture into an aqueous phase under conditions sufficient to form an aqueous dispersion of a plurality of stabilized droplets that have an average diameter of no greater than about 1000 nm and contain both the prepolymer and the monomer(s), and
   (c) subjecting the dispersion from step (b) to conditions sufficient to polymerize the monomer(s) and chain-extend said prepolymer in a single step to form a plurality of hybrid polymer/polyurethane particles having an average diameter of no greater than about 1000 nm dispersed in said aqueous phase, and wherein the hybrid particles have a particle size that differs from the size of the stabilized droplets formed in step (b) by no more than 10%.

2. The process of claim 1 wherein the aqueous phase contains water and at least one external surfactant.

3. The process of claim 2, wherein the isocyanate-terminated prepolymer contains from 1.8 to 4 isocyanate groups/molecule and has a weight per isocyanate group of 500 to 3000 daltons.

4. The process of claim 3, wherein the monomer(s) has a solubility in water at 25° C. of less than 2 grams/liter.

5. The process of claim 4 wherein the mixture of prepolymer and monomer has a viscosity of no greater than 1000 cpa (1 Pa·s) at 25° C.

6. The process of claim 5 wherein the prepolymer is water-dispersible.

7. The process of claim 6, wherein the prepolymer is the reaction product of a polyisocyanate and a mixture of a polymer containing oxyethylene groups and one or more other isocyanate-reactive materials, the mixture having an oxyethylene content of from about 5 to about 25 % by weight, based on the weight of the mixture.

8. The process of claim 5 wherein the droplets have an average diameter of no greater than 300 nm.

9. The process of claim 8 wherein the prepolymer is chain-extended with water.

10. The process of claim 8 wherein the prepolymer is chain-extended with water and a water-soluble auxiliary chain extender.

11. The process of claim 5 wherein a costabilizer having a solubility in water of less than $10^{-5}$ g/liter is used.

12. The process of claim 8 wherein the surfactant is a mixture of an anionic and nonionic surfactants.

13. The process of claim 1, further comprising the step of, after step (b) and before step (c), dissolving a gaseous monomer into the aqueous dispersion under conditions such that the gaseous monomer diffuses to the stabilized droplets.

14. The process of claim 13, wherein the gaseous monomer is butadiene and the liquid or solid monomer comprises styrene.

15. A dispersion of polymer particles prepared in the process of claim 1.

16. A dispersion of polymer particles prepared in the process of claim 5.

17. A dispersion of polymer particles prepared in the process of claim 13.

18. A dispersion of polymer particles in a continuous aqueous phase, wherein the polymer particles are hybrid particles of a polyurethane and a polymer of a monomer having at least one site of polynierizable carbon-carbon unsaturation, further characterized in that the polymer particles have an average diameter of less than about 1000 nm and exhibit a core-shell morphology on transmission electron spectroscopy in which the particles have a polyurethane shell and a core of the polymer of a monomer having at least one site of polymerizable carbon-carbon unsaturation.

19. The dispersion of claim 18 wherein the monomer includes an acrylic ester.

20. A film made by coagulating or drying the dispersion of claim 18.

21. A film made by coagulating or drying the dispersion of claim 15.

* * * * *